(12) United States Patent
Lai et al.

(10) Patent No.: US 6,490,665 B1
(45) Date of Patent: Dec. 3, 2002

(54) MEMORY-ACCESS MANAGEMENT METHOD AND SYSTEM FOR SYNCHRONOUS RANDOM-ACCESS MEMORY OR THE LIKE

(75) Inventors: Jiin Lai, Taipei (TW); Chih-kuo Kao, Taipei (TW); Chia-Hsin Chen, Taipei (TW)

(73) Assignee: Via Technologies, Inc., Taipei Hsien (TW)

( * ) Notice: Subject to any disclaimer, the term of this patent is extended or adjusted under 35 U.S.C. 154(b) by 0 days.

(21) Appl. No.: 09/350,974

(22) Filed: Jul. 9, 1999

(30) Foreign Application Priority Data

Mar. 5, 1999 (TW) ........................................ 88103372 A

(51) Int. Cl.[7] .......................... G06F 12/00; G06F 12/12
(52) U.S. Cl. ........................ 711/160; 711/156; 711/136
(58) Field of Search ................................ 711/156, 159, 711/160, 205, 221, 154, 202, 136

(56) References Cited

U.S. PATENT DOCUMENTS 5,481,689 A * 1/1996 Stamm et al. .............. 711/202
5,781,922 A * 7/1998 Braceras et al. ............ 711/118
5,873,123 A * 2/1999 Patel et al. ................. 711/202
6,069,638 A * 5/2000 Porterfield ................. 345/516

* cited by examiner

Primary Examiner—Matthew Kim
Assistant Examiner—Matthew D. Anderson
(74) Attorney, Agent, or Firm—J. C. Patents

(57) ABSTRACT

A memory-access management method and system is provided for use with an SDRAM (Synchronous Dynamic Random-Access Memory) or the like, for the purpose of increasing the performance of memory access to the SDRAM by means of tracking the memory-access history of previous access operations. The memory-page management system includes a page-table register unit including a page table for storing a predefined number of recently accessed memory locations of the memory unit. Further, the memory-page management system includes a comparison unit capable of, in response to each access request to the memory unit, checking whether the requested memory location is a hit to any one stored in the page table in the page-table register unit. A utilization-rate register unit is coupled to the page-table register unit for monitoring the least-recently-used records stored in the page-table register unit; and moreover, a validity-checking unit is coupled to the page-table register unit for checking whether the address data stored in the page table in the page-table register unit is valid or invalid.

11 Claims, 14 Drawing Sheets

125

|   | BKVC | BNK | SEG | PAG | LRU | VLD |
|---|------|-----|-----|-----|-----|-----|
| A | 1    | 1   | 30  | 20  | 0   | 1   |
| B | 0    | 0   | 0   | 0   | 7   | 0   |
| ⋮ | ⋮    | ⋮   | ⋮   | ⋮   | ⋮   | ⋮   |
| H | 0    | 0   | 0   | 0   | 1   | 0   |

FIG. 2

|   | Address | LRU | VLD |
|---|---------|-----|-----|
| A | 0 | 7 | 0 |
| B | 0 | 6 | 0 |
| C | 0 | 5 | 0 |
| D | 0 | 4 | 0 |
| E | 0 | 3 | 0 |
| F | 0 | 2 | 0 |
| G | 0 | 1 | 0 |
| H | 0 | 0 | 0 |

FIG. 7A

|   | Address | LRU | VLD |
|---|---------|-----|-----|
| A | 10 | 0 | 1 |
| B | 0 | 7 | 0 |
| C | 0 | 6 | 0 |
| D | 0 | 5 | 0 |
| E | 0 | 4 | 0 |
| F | 0 | 3 | 0 |
| G | 0 | 2 | 0 |
| H | 0 | 1 | 0 |

FIG. 7B

|   | Address | LRU | VLD |
|---|---------|-----|-----|
| A | 10 | 1 | 1 |
| B | 20 | 0 | 1 |
| C | 0 | 7 | 0 |
| D | 0 | 6 | 0 |
| E | 0 | 5 | 0 |
| F | 0 | 4 | 0 |
| G | 0 | 3 | 0 |
| H | 0 | 2 | 0 |

FIG. 7C

|   | Address | LRU | VLD |
|---|---------|-----|-----|
| A | 10 | 7 | 1 |
| B | 20 | 6 | 1 |
| C | 30 | 5 | 1 |
| D | 40 | 4 | 1 |
| E | 50 | 3 | 1 |
| F | 60 | 2 | 1 |
| G | 70 | 1 | 1 |
| H | 80 | 0 | 1 |

FIG. 7D

|   | Address | LRU | VLD |
|---|---------|-----|-----|
| A | 90 | 0 | 1 |
| B | 20 | 7 | 1 |
| C | 30 | 6 | 1 |
| D | 40 | 5 | 1 |
| E | 50 | 4 | 1 |
| F | 60 | 3 | 1 |
| G | 70 | 2 | 1 |
| H | 80 | 1 | 1 |

FIG. 7E

|   | Address | LRU | VLD |
|---|---------|-----|-----|
| A | 90 | 1 | 1 |
| B | 20 | 7 | 1 |
| C | 30 | 6 | 1 |
| D | 40 | 0 | 1 |
| E | 50 | 5 | 1 |
| F | 60 | 4 | 1 |
| G | 70 | 3 | 1 |
| H | 80 | 2 | 1 |

FIG. 7F

|   | Address | LRU | VLD |
|---|---|---|---|
| A | 90 | 2 | 1 |
| B | 22 | 0 | 1 |
| C | 30 | 7 | 1 |
| D | 40 | 1 | 1 |
| E | 50 | 6 | 1 |
| F | 60 | 5 | 1 |
| G | 70 | 4 | 1 |
| H | 80 | 3 | 1 |

FIG. 7G

MEMORY-ACCESS MANAGEMENT METHOD AND SYSTEM FOR SYNCHRONOUS RANDOM-ACCESS MEMORY OR THE LIKE

CROSS-REFERENCE TO RELATED APPLICATION

This application claims the priority benefit of Taiwan application Ser. No. 88103372, filed Mar. 5, 1999, the full disclosure of which is incorporated herein by reference.

BACKGROUND OF THE INVENTION

1. Field of the Invention

This invention relates to computer memory management, and more particularly, to a memory-access management method and system which is designed for use with an SDRAM (Synchronous Dynamic Random-Access Memory) or the like, for the purpose of increasing the performance of memory access to the SDRAM by means of tracking the memory-access history of previous access operations.

2. Description of Related Art

In a computer system, a master unit is used to control the access operations, whether read or write, to the primary memory of the computer system. In general, the memory access would be focused on some particular segments rather than all the segments in the primary memory; in other words, some segments would be most often accessed than others. In the design of a memory-access management system, the primary concern is directed to the reduction of overhead and latency.

The SDRAM (Synchronous Dynamic Random-Access Memory) is a new type of memory device. Each SDRAM unit is typically partitioned into four sub-banks, each sub-bank containing a number of pages and only one of which can be opened at the same time. In other words, in each SDRAM unit, at most four pages can be opened at the same time. Conventionally, each sub-bank is associated with one memory control unit for managing the pages in the sub-bank. Therefore, for each SDRAM unit, four memory control units are required. This page management scheme, however, has the following drawbacks.

First, in the case a memory slot is unused or is mounted with an SDRAM unit that contains only two sub-banks, the provision of four memory control units will not be fully utilized, and therefore is cost-ineffective in utilization.

Second, when VC-SDRAM (Virtual Channel SDRAM) is used, since each VC-SDRAM unit can provide 16 channels, the provision of four memory control units will allow only four of the 16 channels to be usable and the other 12 channels to be unused. A solution to this problem is to provide 16 memory control units for each VC-SDRAM unit. However, this solution would require a very large circuit layout area to incorporate all the 16 memory control units, and therefore is quite cost-ineffective. Moreover, the use of 16 memory control units would cause a large delay to the access operation and therefore is unsuitable for use with a high-speed computer system.

There exists, therefore, a need for a new memory-access management method and system which can be used with various types of memory devices, including SDRAM, VC-SDRAM, and EDO DRAM.

SUMMARY OF THE INVENTION

It is therefore an objective of this invention to provide a new computer memory-access management method and system, which is designed for use with an SDRAM or the like, for the purpose of increasing the performance of memory access to the SDRAM.

In accordance with the foregoing and other objectives of this invention, a new computer memory-access management method and system is provided.

The memory-page management system of the invention includes a comparison unit, a page-table register unit, a utilization-rate register unit, and a validity-checking unit.

The page-table register unit includes a page table for storing a predefined number of recently accessed memory locations to the memory unit, each stored memory location being stored along with a least-recently-used record indicative of whether the stored memory location is least recently accessed.

The comparison unit is capable of, in response to each access request to the memory unit, checking whether the requested memory location is a hit to any one stored in the page table in the page-table register unit; if hit, the comparison unit generating a hit signal;

The utilization-rate register unit is coupled to the page-table register unit for monitoring the least-recently-used records stored in the page-table register unit; and the validity-checking unit is coupled to the page-table register unit for checking whether the address data stored in the page table in the page-table register unit is valid or invalid.

The page-table register unit includes: a latch circuit, coupled to the comparison unit, for latching the output signals from the comparison unit indicative of whether the memory location is a hit to the page table; and a selection circuit, coupled to the latch circuit, the utilization-rate register unit, and the validity-checking unit, for selecting one of the stored memory locations in the page table based on the output signals from the latch circuit, the utilization-rate register unit, and the validity-checking unit.

The page table further includes a plurality of validity bits, each being in association with one of the stored memory locations in the page table, with the validity bit indicating whether the associated memory location is valid or invalid. Each validity bit is set and updated by the comparison unit.

Each least-recently-used record is represented by a numerical value in a predefined range of numbers, with the smallest value indicating that the associated memory location has been most recently accessed and the highest value indicating that the associated memory location has been least recently accessed. The least-recently-used record in association with each stored memory location in the page table is set and updated by the utilization-rate register unit.

In the event that the current access request is a miss to the page table, the memory location of the current access request is used to replace the one whose least-recently-used record has the highest value; and before the memory location of the current access request replaces the one whose least-recently-used record has the highest value, the validity-checking unit checks whether the associated validity bit is set to indicate validity; if yes, a restore signal is generated to restore the corresponding memory location to original state.

In accordance with another aspect of the invention, the memory-page management system includes a page-table register unit including a page table for storing a predefined number of recently accessed memory locations to the memory unit, each stored memory location including a bank address and a page address, and each stored memory location being stored along with a least-recently-used record and a validity bit, with the least-recently-used record indicative of whether the associated memory location is least recently used and the validity bit indicative of whether the associated memory location is valid or invalid; and each least-recently-used record being represented by a numerical value in a predefined range of numbers, with the smallest value indicating that the associated memory location has been most recently accessed and the highest value indicating that the associated memory location has been least recently accessed. Further, the memory-page management system includes a comparison unit capable of, in response to each access request to the memory unit, checking whether the requested memory location is a bank hit or a page hit to any one of the memory locations stored in the page table in the page-table register unit; the comparison unit generating a bank-hit signal if bank hit and a page-hit signal if page hit. Moreover, a utilization-rate register unit is coupled to the page-table register unit for monitoring the least-recently-used records stored in the page-table register unit, and in the event of page miss and bank miss to the page table, capable of replacing the one of the stored memory locations in the page table that is least recently accessed with the memory location of the current access request; and a validity-checking unit is coupled to the page-table register unit for checking whether the address data stored in the page table in the page-table register unit is valid or invalid.

In accordance with another aspect, the invention provides a memory-page management method, which comprises the steps of: (1) providing a page table for storing a predefined number of recently accessed memory locations to the memory unit, each stored memory location being stored along with a least-recently-used record and a validity bit, with the least-recently-used record indicative of whether the associated memory location is least recently used and the validity bit indicative of whether the associated memory location is valid or invalid; (2) in response to an access request, comparing the requested memory location with the memory location data stored in the page table to see if there is a match; if yes, generating a hit signal; whereas if not, replacing the one of the stored memory locations in the page table that is least recently accessed with the memory location of the current access request; and (3) checking whether the associated validity bit of the least recently-accessed memory location is set to indicate validity; if yes, generating a restore signal is generated to restore the corresponding memory location to original state.

The memory-access management method and system of the invention has the following advantages. First, it can increase the memory access performance by tracking the history of the previous access operations to the SDRAM. Second, it can judge in advance whether the next pipelined access requires precharge or not; if yes, a pre-charge-enable signal is issued at the time the current access is being handled. As a result, the delay in access can be reduced. Overall, the memory access performance is increased.

BRIEF DESCRIPTION OF DRAWINGS

The invention can be more fully understood by reading the following detailed description of the preferred embodiments, with reference made to the accompanying drawings, wherein:

FIG. 2 is a schematic diagram showing one example of a page table utilized in the memory-access management system of FIG. 1;

FIGS. 7A–7G are tables used to show an example of the data stored in the page table utilized in the memory-access management system of FIG. 1 in response to a sequence of access requests;

DETAILED DESCRIPTION OF PREFERRED EMBODIMENTS

The invention provides a memory-access management method and system which utilizes a page table to track the history of previous access operations to a memory unit, such as a SDRAM or the like, by registering the address data of the previous access requests. In response to any subsequent access request, the page table is first checked to see if the currently requested memory address match any registered address data in the page table. This scheme can help increase the rate of page hit to the memory unit, thus increasing the overall access performance to the memory unit.

Figure 1:
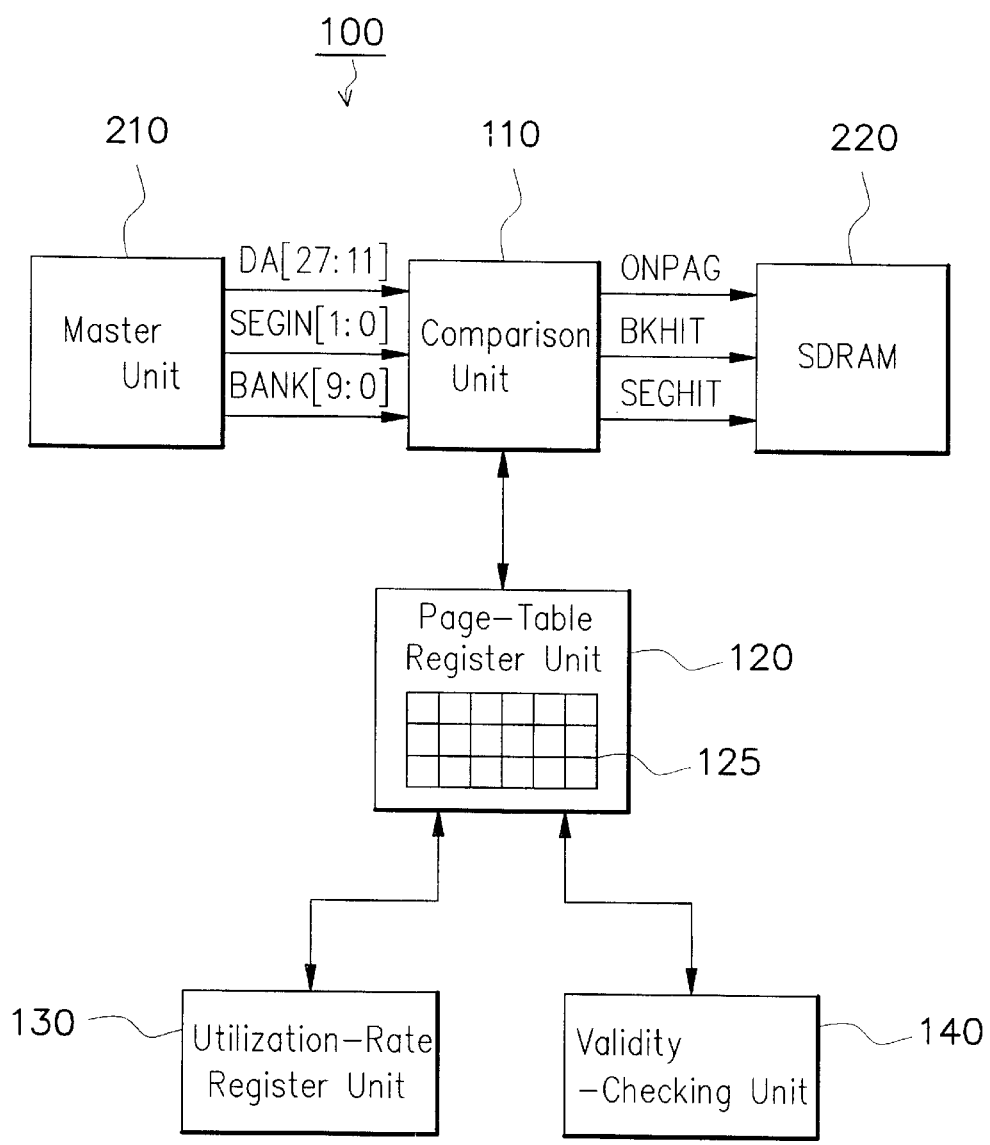
FIG. 1 is a schematic block diagram showing the basic hardware configuration of the memory-access management method and system according to the invention.

FIG. 1 is a schematic block diagram showing the basic configuration of the hardware implementation of the memory-access management method and system according to the invention. As shown, the memory-access management system of the invention, here designated by the reference numeral 100, includes a comparison unit 110, a page-table register unit 120, a utilization-rate register unit 130, and a validity-checking unit 140. In use, the memory-access management system 100 is coupled between a master unit 210 and an SDRAM unit 220, and is capable of allowing the master unit 210 to gain access to the SDRAM unit 220 in a more efficient manner.

The comparison unit 110 has an input side coupled to the master unit 210 for receiving a number of decoded address signals DA[27:11], SEGIN[1:0], and BANK[9:0] from the same, and an output side for outputting a number of access control signals including a page-hit signal ONPAG, a bank-hit signal BKHIT, and a segment-hit signal SEGHIT to the SDRAM unit 220. It is to be noted that these signals are switched to enabled state when the associated data line is put at a certain logic state, which can be either a high-voltage logic state or a low-voltage logic state based on designer's choice. When the page-hit signal ONPAG is enabled, it indicates that the requested data are located in the currently opened page; when the bank-hit signal BKHIT is enabled, it indicates that the requested data are located in the current bank; and when the segment-hit signal SEGHIT is enabled, it indicated that the requested data are located in the current segment. Further, in use of the SDRAM unit 220, it requires the issuing of a precharge-enable signal and an activate-enable signal to the SDRAM unit 220 when it is desired to open or close a particular page in the SDRAM unit 220. This requirement is well-known to anyone skilled in the use of SDRAM and not within the spirit and scope of the invention, so that the signal routes for precharge-enable signal and activate-enable signal are not show in FIG. 1 for simplification of the drawing and description.

The page-table register unit 120 is used to store a page table 125 used to register the address data of previous access operations to the SDRAM unit 220. One example of the page table 125 is shown in FIG. 2. As shown, the page table 125 contains a predefined number of rows and columns of data, for example 8 rows respectively labeled by the reference letters A, B, . . . , and H, with each row containing six fields of data: BKVC, BNK, SEG, PAG, LRU, and VLD (note that hereinafter throughout this specification, the notation BKVC_A is used to represent the content of the BKVC field in row A, or the data signal that is used to set the content of the BKVC field in row A to a specified value). Each row is for use by one previous access operation. The BKVC field is used to indicate data stored in a page table is a previous access to a VC-SDRAM unit (in the case the SDRAM unit 220 is a VC-SDRAM unit); the BNK field is used to store the bank address of a previous access to the SDRAM unit 220 or VC-SDRAM; the SEG field is used to store the segment address of a previous access to VC-SDRAM; the PAG field is used to store the page address of a previous access to the SDRAM unit 220 or VC-SDRAM. In addition, the LRU field is used to store a numerical value in the range from 0 to 7 that defines the level of utilization of the associated address data registered in the BKVC, BNK, SEG, and PAG fields; and the VLD field is used to store a valid bit indicative of whether the associated address data is valid or invalid. In the example of FIG. 2, only the data fields that are related to the spirit and scope of the invention are listed. In practical implementation, the page table 125 may contains other additional fields for storing data of various other purposes based on actual application requirements. Moreover, these data fields are shown here in a collective manner in one table, but in practice, some of the data fields may be incorporated in other units; for example, the LRU data can be incorporated in the utilization-rate register unit 130, and the VLD data can be incorporated in the validity-checking unit 140.

Figure 3:
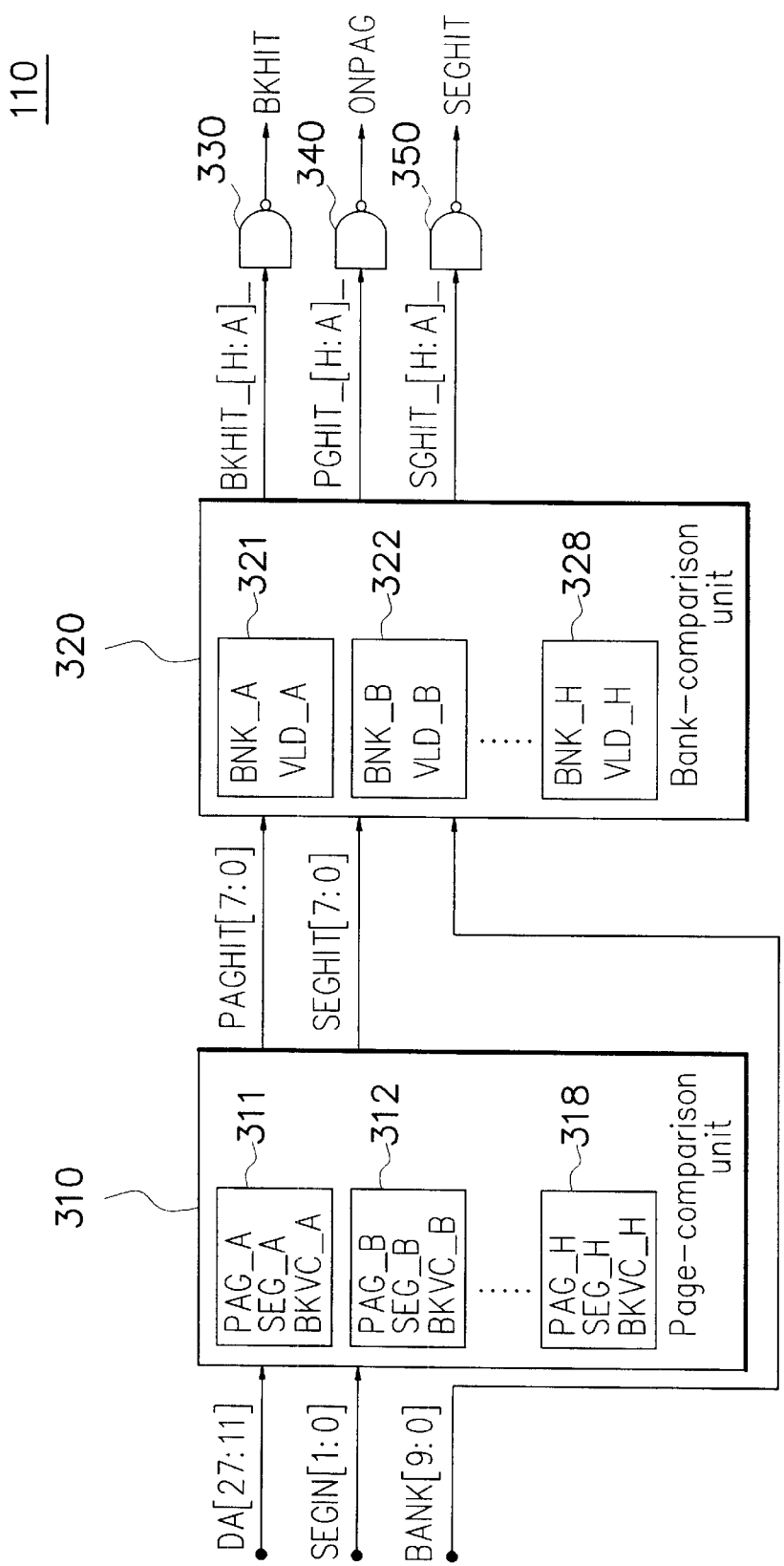
FIG. 3 is a schematic block diagram showing more detailed inside architecture of the comparison unit utilized in the memory-access management system of FIG. 1.

FIG. 3 is a schematic block diagram showing more detailed inside architecture of the comparison unit 110 utilized in the memory-access management system 100 of FIG. 1. As shown, the comparison unit 110 includes a page-comparison unit 310, a bank-comparison unit 320, and a set of NAND gates 330, 340, 350. The page-comparison unit 310 is used to compare the address data of the currently issued access request from the master unit 210, i.e., DA[27:1] and the SEGIN[1:0], with each of the eight sets of address data (PAG_A, SEG_A, BKVC_A) 311, (PAG_B, SEG_B, BKVC_B) 312, . . . , and (PAG_H, SEG_H, BKVC_H) 318 from the page table 125 to check whether the requested memory location has been recently accessed. The page-comparison unit 310 outputs a page-hit signal PAGHIT[7:0] indicative of whether the current access request is a page hit, and a segment-hit signal SEGHIT[7:0] indicative of whether the current access request is a segment hit.

The bank-comparison unit 320 is used to compare the bank address data of the currently issued access request from the master unit 210, i.e., BANK[9:0], with each of the eight sets of address data (BNK_A, VLD_A) 321, (BNK_B, VLD_B) 322, . . . , and (BNK_H, VLD_H) 328. The bank-comparison unit 320 outputs a bank-hit signal BKHIT_[H:A]_ indicative of whether the current access request is a bank hit, a page-hit signal PGHIT_[H:A]_ indicative of whether the current access request is a page hit, and a segment-hit signal SGHIT_[H:A]_ indicative of whether the current access request is a segment hit. In this preferred embodiment, these signals BKHIT_[H:A]_, PGHIT_[H:A]_, and SGHIT_[H:A]_ are each put in enabled state when the associated output port is put at a low-voltage logic state. Therefore, the bank-hit signal BKHIT_[H:A]_ is subsequently inverted by the first NAND gate 330 into a high-voltage logic state to represent the enabling of the bank-hit signal BKHIT issued to the SDRAM unit 220; the page-hit signal PGHIT_[H:A]_ is subsequently inverted by the second NAND gate 340 into a high-voltage logic state to represent the enabling of the page-hit signal ONPAG issued to the SDRAM unit 220; and the segment-hit signal SGHIT_[H:A]_ is subsequently inverted by the third NAND gate 350 into a high-voltage logic state to represent the enabling of the segment-hit signal SEGHIT issued to the SDRAM unit 220.

Figure 4:
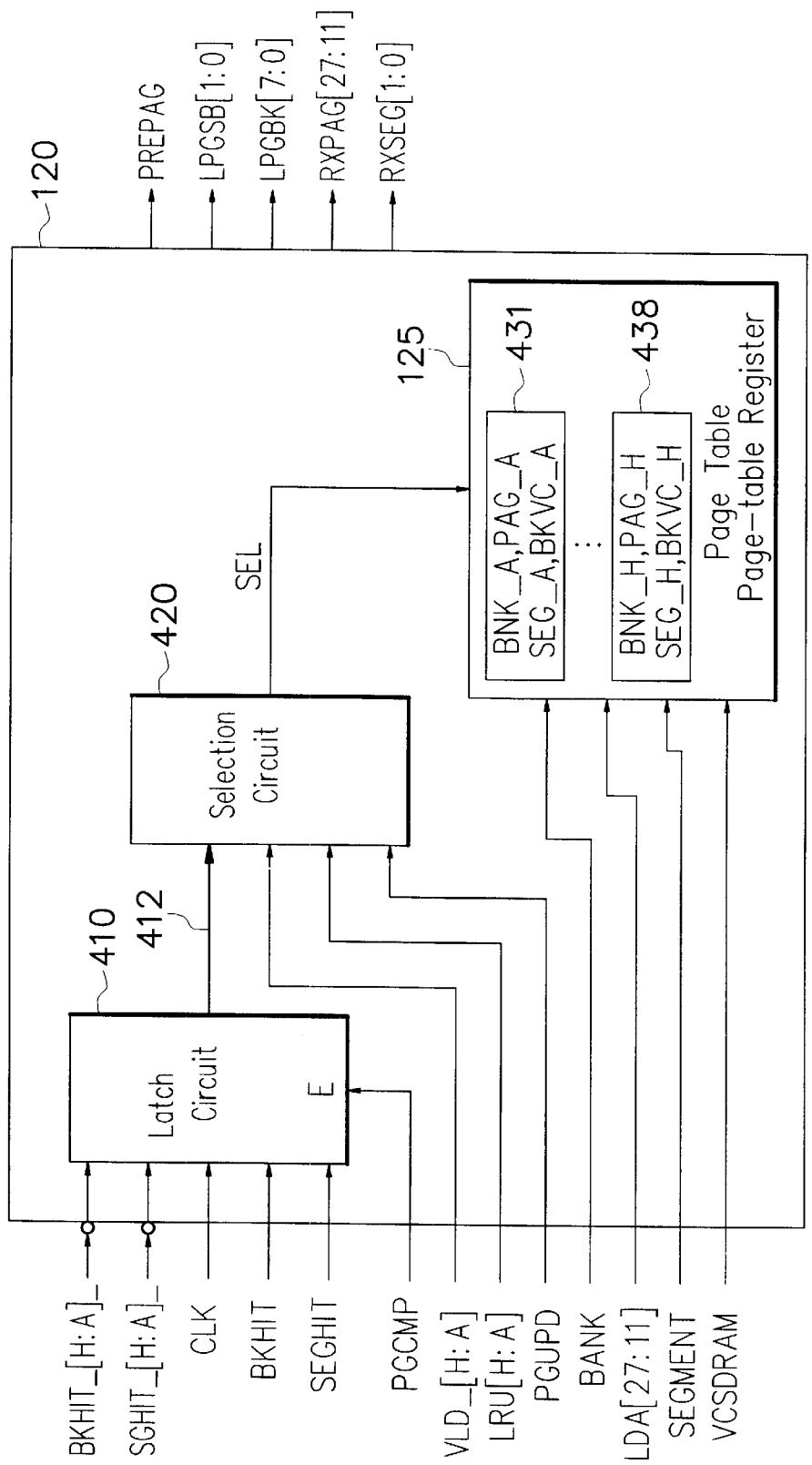
FIG. 4 is a schematic block diagram showing more detailed inside architecture of the page-table register unit utilized in the memory-access management system of FIG. 1.

FIG. 4 is a schematic block diagram showing more detailed inside architecture of the page-table register unit 120 utilized in the memory-access management system 100 of FIG. 1. As shown, the page-table register unit 120 includes a latch circuit 410 and a selection circuit 420. Moreover, the page-table register unit 120 includes eight register sets (BNK_A, PAG_A, SEG_A, BKVC_A) 431, . . . , (BNK_H, PAG_H, SEG_H, BKVC_H) 438, each register set being used for storing the address data of a previous access operation to the SDRAM unit 220. These eight register sets (BNK_A, PAG_A, SEG_A, BKVC_A) 431, . . . , (BNK_H, PAG_H, SEG_H, BKVC_H) 438 collectively implement part of the page table 125 shown in FIG. 2 (in this embodiment, the other two fields of data, i.e., LRU and VLD, are respectively incorporated in the utilization-rate register unit 130 and the validity-checking unit 140). The latch circuit 410 is under control by the signal PGCMP to latch the output data BKHIT_[H:A]_, SGHIT_[H:A]_, BKHIT, and SEGHIT from the comparison unit 110. The latched data are then transferred via a data bus 412 to the selection circuit 420. In addition to the output data from the latch circuit 410, the selection circuit 420 receives VLD_[H:A] and LRU[H:A] from the utilization-rate register unit 130 and a control signal PGUPD to thereby generate and transfer a selection signal SEL to the page table 125 to select the data item in the page table 125 that is to be updated in value by the input signals BANK, LDA[27:11], SEGMENT, and VCSDRAM. The output signals from the page-table register unit 120 include PREPAG, LPGSB[1:0], LPGBK[7:0], RXPAG[27:11], and RXSEG[1:0].

Figure 5A:
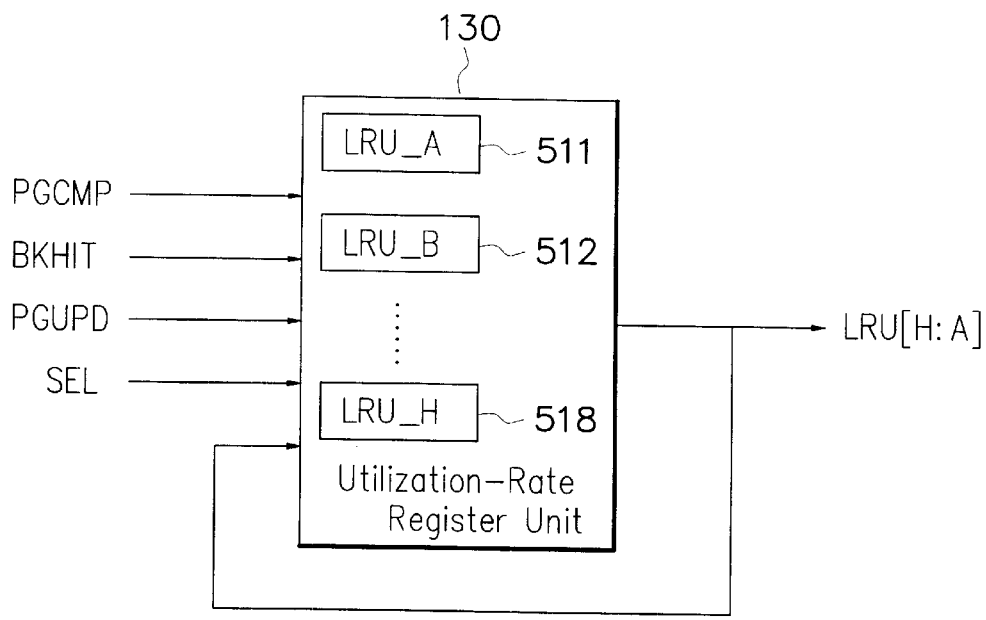
FIG. 5A is a schematic block diagram showing more detailed inside architecture of the utilization-rate register unit utilized in the memory-access management system of FIG. 1.

FIG. 5A is a schematic block diagram showing more detailed inside architecture of the utilization-rate register unit 130 used in the memory-access management system 100 of FIG. 1. As shown, the utilization-rate register unit 130 includes a set of registers 511, 512, . . . , 518 for storage of the data LRU_A, LRU_B, . . . , and LRU_H. The utilization-rate register unit 130 takes PGCMP, BKHIT, PGUPD, and SEL as input signals and generates an output signal LRU[H:A]. Moreover, the output signal LRU[H:A] is taken as a feedback to the input side of the utilization-rate register unit 130. In accordance with the invention, the LRU_A, LRU_B, . . . , and LRU_H registers 511, 512, . . . , 518 are used to store the respective the LRU values indicative of recent utilization rates of previously accessed memory locations in the SDRAM unit 220. As mentioned earlier, each of the LRU values is in the range from 0 to 7; and the LRU values in these eight registers 511, 512, ..., 518 are uniquely assigned and different from each other (in other words, the sum of the respective values stored in these eight registers 511, 512, ..., 518 is always 28). The smallest value 0 is used to indicate that the associated memory location has been most recently accessed, and the highest value 7 is used to indicate that the associated memory location has been least recently accessed. The updating to the values in these eight registers 511, 512, ..., 518 is carried out after one clock cycle after the PGCMP signal or the PGUPD signal is enabled. The period of this delay of one clock cycle can be used for the computation of updated values to these eight registers 511, 512, ..., 518. When the current access request is a bank hit, the requested bank address will be matched to the bank address data stored in a certain storage cell in the page table 125. At the initialization, these eight registers 511, 512, ..., 518 are each set to a certain initialization value, for example 0, so that the operation would not be halted by any undefined data in the page table 125.

Figure 5B:
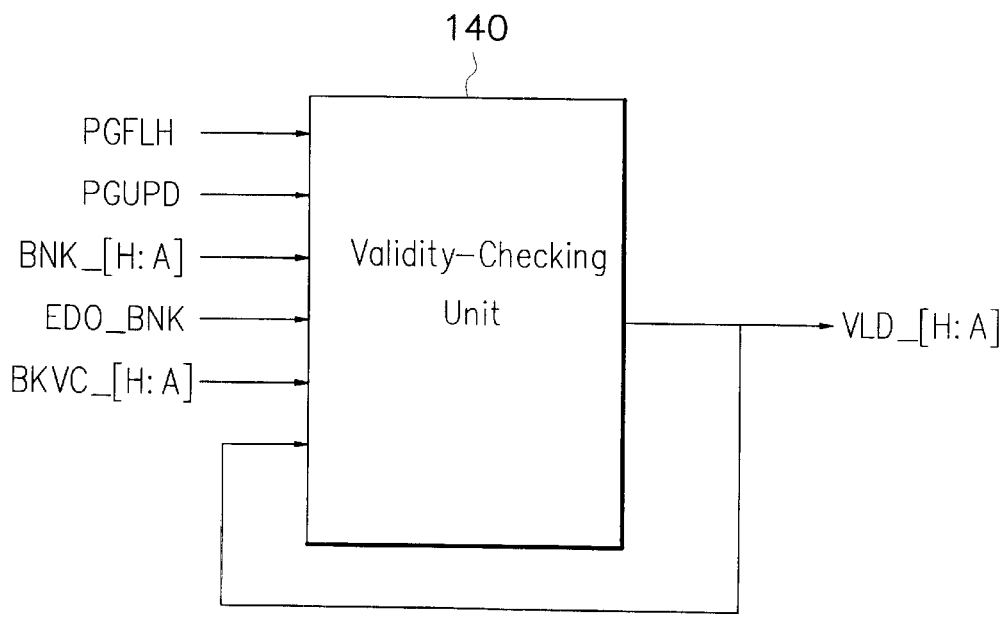
FIG. 5B is a schematic block diagram showing the input/output configuration of the validity-checking unit utilized in the memory-access management system of FIG. 1.

FIG. 5B is a schematic block diagram showing the input/output configuration of the validity-checking unit 140 utilized in the memory-access management system 100 of FIG. 1. As shown, the validity-checking unit 140 takes PGFLH, PGUPD, BNK_[H:A], EDO_BNK, and BKVC_[H:A] as input signals and generates an output signal VLD_[H:A]. The output signal output signal VLD_[H:A] is further taken as a feedback to the input side of the validity-checking unit 140. The output signal VLD_[H:A] is a data word in which each bit is used to indicate whether the corresponding VLD storage cell in the page table 125 is to be set to 1 indicative of the validity of the associated memory address data, or to be set to 0 indicating that the associated memory address data are invalid or still undefined.

The operation of the memory-access management system 100 of the invention shown in FIG. 1 includes the following main steps.

(1) First, at the initialization, the storage cells in the page table 125 are each set to a certain value, for example 0, so as to prevent the operation from being halted by any undefined data in the page table 125.

(2) Second, when an access request is issued, the requested memory location, including page address, bank address, and segment address, is compared with the address data stored in the page table 125 to check whether the requested memory location has been recently accessed.

(3) Third, the LRU data and VLD data in the page table 125 are checked to see which storage cell is to be updated or selected for storage of the new address data.

Figure 6:
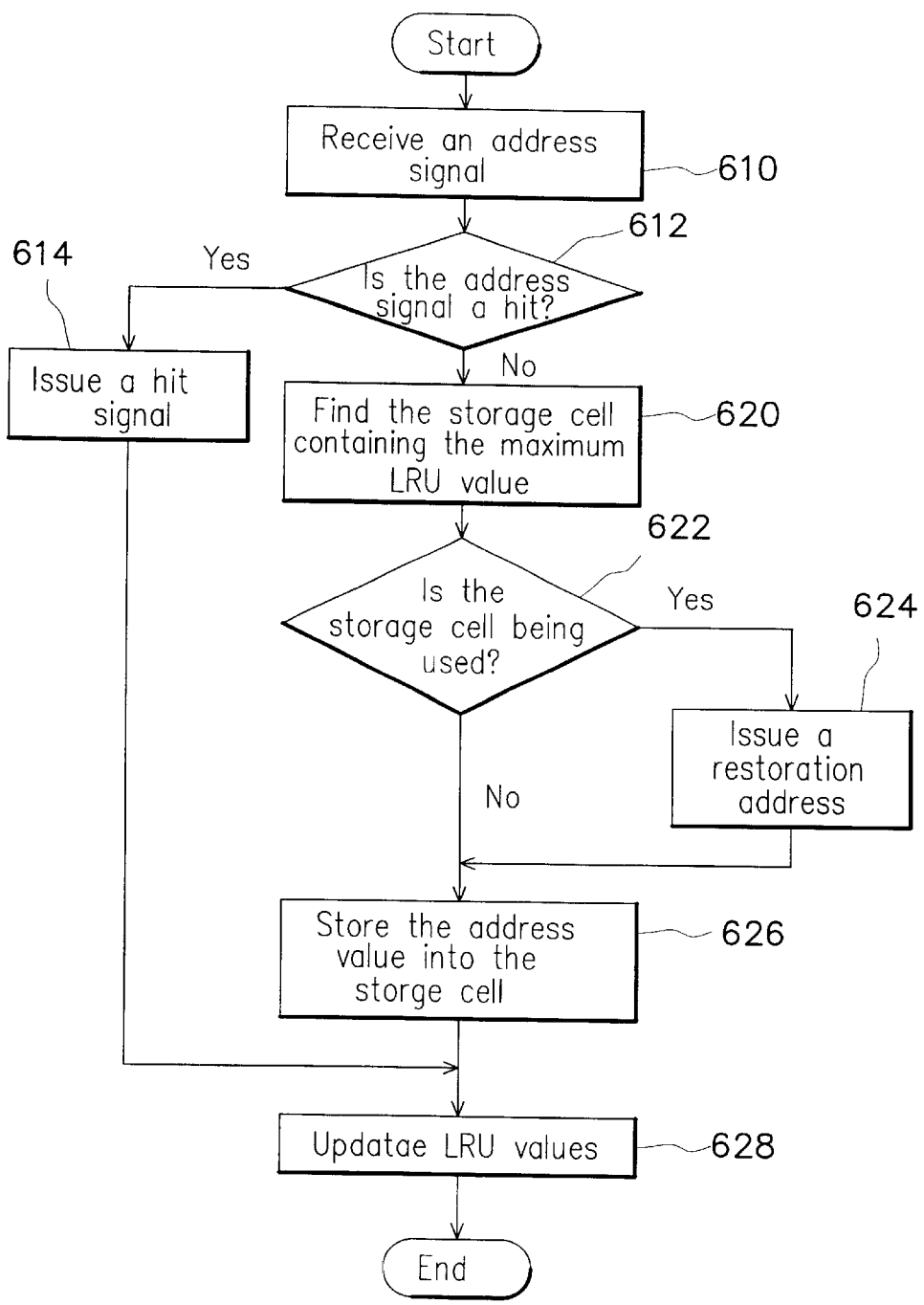
FIG. 6 is a flow diagram showing the procedural steps involved in the method of the method.

FIG. 6 is a flow diagram showing the procedural steps involved in the method of the method.

In the first step 610, an address signal is received from the memory control unit;

In the next step 612, the received address is compared with the address data in the page table to see if there is a match. If YES, the procedure goes to the step 614; otherwise, if NO, the procedure goes to the step 620.

In the step 614, a hit signal is generated; and then the procedure goes to the step 628.

On the other hand, in the step 620, the page table is looked up to find the maximum LRU value. Next, in the step 622, it is checked that whether the VLD value associated with the maximum LRU value is valid. If YES, the procedure goes to the step 624; otherwise, if NO, the procedure goes to the step 626.

In the step 624, a restoration address is generated in accordance with the address data associated with the maximum LRU value to close the corresponding page. After this is completed, the procedure goes to the step 626.

In the step 626, the currently received address is stored into the storage cell associated with the maximum LRU value. The procedure then goes to the step 628.

In the step 628, the storage cell storing the maximum LRU value is reset to 0 LRU value, and all the other LRU values in the page table are added by one. The procedure is then ended.

FIGS. 7A–7G are tables used to show an example of the data stored in the page table 125 utilized in the memory-page management system 100 of FIG. 1 in response to a sequence of access requests. In these tables, the BKVC, BNK, SEG, PAG data shown in the page table 125 of FIG. 2 are here collectively represented by the ADDRESS data in the first column for simplification of the description.

FIG. 7A shows the ADDRESS, LRU, and VLD data stored in the page table at initialization. As shown, the initialization sets all the eight ADDRESS values in the eight rows A–H to 0, and since all these ADDRESS values are invalid (which means that they don't represent the address data of any previous access to the SDRAM), all the VLD storage cells are set to 0. Further, the LRU storage cells are set to 7, 6, 5, 4, 3, 2, 1, and 0, respectively.

Assume the master unit 210 then issues a sequence of access requests to gain access to the SDRAM unit 220.

Referring to FIG. 7B, assume the first access request is directed to the page address "10"; then, since all the ADDRESS values in the current page table are unused, this page address "10" is stored into the ADDRESS storage cell of the first row A; and meanwhile, the VLD storage cell of row A is set 1. Further, the LRU storage cell of row A is set to 0, with the LRU storage cells in other rows that are less than 7 being increased by one.

Referring further to FIG. 7C, assume the subsequent access request is directed to the page address "20"; then, this page address "20" is compared with all the ADDRESS values in the page table of FIG. 7B to check whether there is a match to this page address "20". In this example, the comparison result is NO; and consequently, this page address "20" is stored into the ADDRESS storage cell of the next row B; and meanwhile, the VLD storage cell of row B is set to 1. Further, the LRU storage cell of row B is set to 0, with the LRU storage cells in other rows that are less than 7 being increased by one.

Referring further to FIG. 7D, assume the subsequent access requests are directed respectively to the page addresses "30", "40", "50", "60", "70", and "80"; then, since none of these page addresses is a match to the stored page address values in the page table, these page addresses are stored into the remaining unused ADDRESS storage cells and the associated LRU and VLD values are set in the same manner described above.

Referring further to FIG. 7E, assume the subsequent access request is directed to the page address "90"; then, this page address "90" is compared with all the ADDRESS values in the page table of FIG. 7D to check whether there is a match to this page address "90". In this example, the comparison result is NO; and consequently, this page address "90" is stored into the ADDRESS storage cell in the row that contains the highest LRU value (in this example, the ADDRESS storage cell of the last row A which contains the highest LRU value 7 (see FIG. 7D). The VLD storage cell of row A remains unchanged. Further, the LRU storage cell of row A is changed from 7 to 0, with all the other LRU storage cells in the other rows that are less than 7 are increased by one. Furthermore, since the VLD storage cell of row A is previously set to 1, it causes the issuing of a precharge-enable signal to the SDRAM unit 220 to close the currently opened page at the page address "10".

Referring further to FIG. 7F, assume the subsequent access request is directed to the page address "40"; then, this page address "40" is first compared with all the ADDRESS values in the page table of FIG. 7E to check whether there is a match to this page address "40". In this example, the comparison result is YES since the ADDRESS storage cell of row D is "40". In this case, the ADDRESS and VLD storage cells are unchanged in value, while the LRU storage cell is changed from 5 to 0. Furthermore, all the other LRU storage cells in other rows that are less than the original value stored in the LRU storage cell of row D are increased by one (i.e., the respective LRU storage cells of the rows A, E, F, G and H are each increased by one).

Referring further to FIG. 7G, assume the subsequent access request is directed to the page address "22" and the requested page is located in the same bank where the page at the page address "20" is located; then, this page address "22" is compared with all the storage cells in the ADDRESS field of the page table 125. In this example, the comparison result is a bank hit. In this case, since in each bank only one page can be opened at a time, the ADDRESS value of row B is changed from "20" to "22" and LRU value of row B is changed from 7 to 0, while the VLD value of row B remains unchanged. Furthermore, all the other LRU values in other rows that are less than the original value in the LRU_B storage cell are increased by one (i.e., the respective LRU value of the rows A, D, E, F, G, C and H are each increased by one. Before the requested page can be opened, the currently opened page, i.e., the page at "20", should be closed.

FIGS. 8A–8D and FIGS. 9A–9B are signal sequencing diagrams of the various signals used in the memory-page management system 100 of FIG. 1 in response to various operation conditions. The timings of these signals are based on a common clock signal DCLK.

Figure 8A:
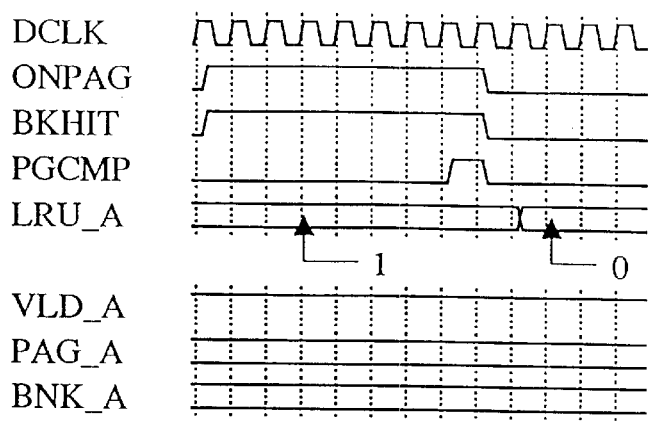
FIGS. 8A–8D are signal sequencing diagrams used to show the timings between various signals in the memory-access management system of the invention.

FIG. 8A is a signal sequencing diagram showing the timings between DCLK, ONPAG, BKHIT, PGCMP, LRU_A, VLD_A, PAG_A, and BNK_A in the case of the current access request from the master unit 210 is a page hit (or a segment hit to VC-SDRAM) and the requested memory location is matched to the one stored in the row A of the page table 125. In this case, the comparison unit 110 switches at T0 the ONPAG and BKHIT signals to the enabled state (i.e., high-voltage logic state); and then at T7, the PGCMP is switched to high-voltage logic state, causing the latch circuit 410 in the page-table register unit 120 to latch the currently received data from the comparison unit 110. Subsequently at T9, the LRU_A signal is enabled to set the corresponding storage cell in the page table 125 to 0.

Figure 8B:
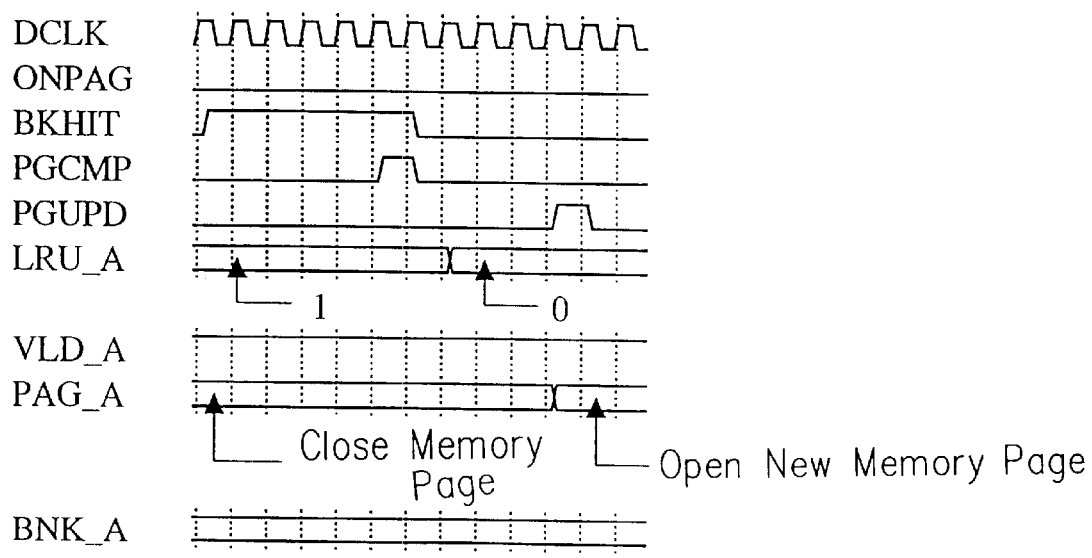

FIG. 8B is a signal sequencing diagram showing the timings between DCLK, ONPAG, BKHIT, PGCMP, PGUPD, LRU_A, VLD_A, PAG_A, and BNK_A in the case of the current access request being a bank hit and yet being a page miss. As mentioned earlier, in each bank only one page can be opened at a time. Therefore, the corresponding storage cell in the page table 125 should be replaced by the page address of the current access request. In response to the access request, the comparison unit 110 switches at T0 the BKHIT signal to the enabled state (i.e., high-voltage logic state) at T0; and then, the currently opened page is closed. Subsequently, the PGCMP signal is switched at T5 to the high-voltage logic state, causing the latch circuit 410 in the page-table register unit 120 to latch the currently received data from the comparison unit 110. Subsequently at T10, the PGUPD is enabled to cause the PAG_A signal to set the corresponding storage cell in the page table 125 to the value of the requested page address. After this, the requested page is opened.

In the case of the current access request being a bank miss, then it is required to find a storage cell in the page table 125 to store the memory location of the most recent access operation. In this case, there are two conditions to be considered, which are respectively depicted in the following with reference to FIGS. 8C and 8D.

Figure 8C:
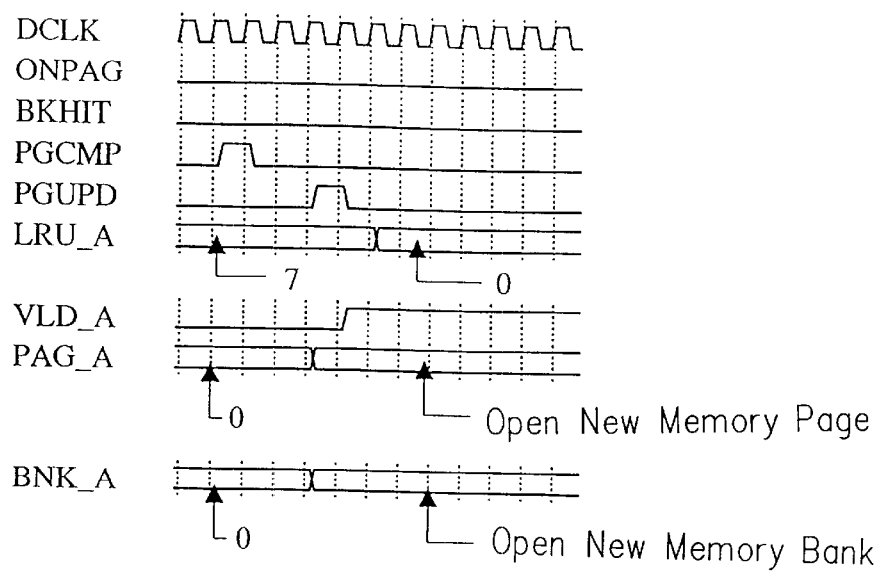

FIG. 8C is a signal sequencing diagram showing the timings between DCLK, ONPAG, BKHIT, PGCMP, PGUPD, LRU_A, VLD_A, PAG_A, and BNK_A in the case of the current access request being a bank miss and there are still unused storage cells in the page table 125. In this case, the comparison unit 110 keeps the ONPAG and BKHIT signals unchanged in state. Subsequently at T1, the PGCMP signal is switched to the enabled state to cause the latch circuit 410 in the page-table register unit 120 to latch the currently received data from the comparison unit 110. Then, from the page table 125, the row containing the highest LRU value and the VLD value 0 is selected for storage of the memory location of the current access request (in this example, the row A is selected). Subsequently at T4, the PGUPD signal is enabled to cause the PAG_A and BNK_A signals to respectively set the corresponding storage cells in the page table 125 to the values of the requested page and bank values and also cause the and VLD_A signal to set the corresponding storage cell to 1. After one clock cycle, the LRU_A signal is enabled to set the corresponding storage cell in the page table 125 to 0; and meanwhile, all the other LRU storage cells in other rows that are less than 7 are increased by one.

Figure 8D:
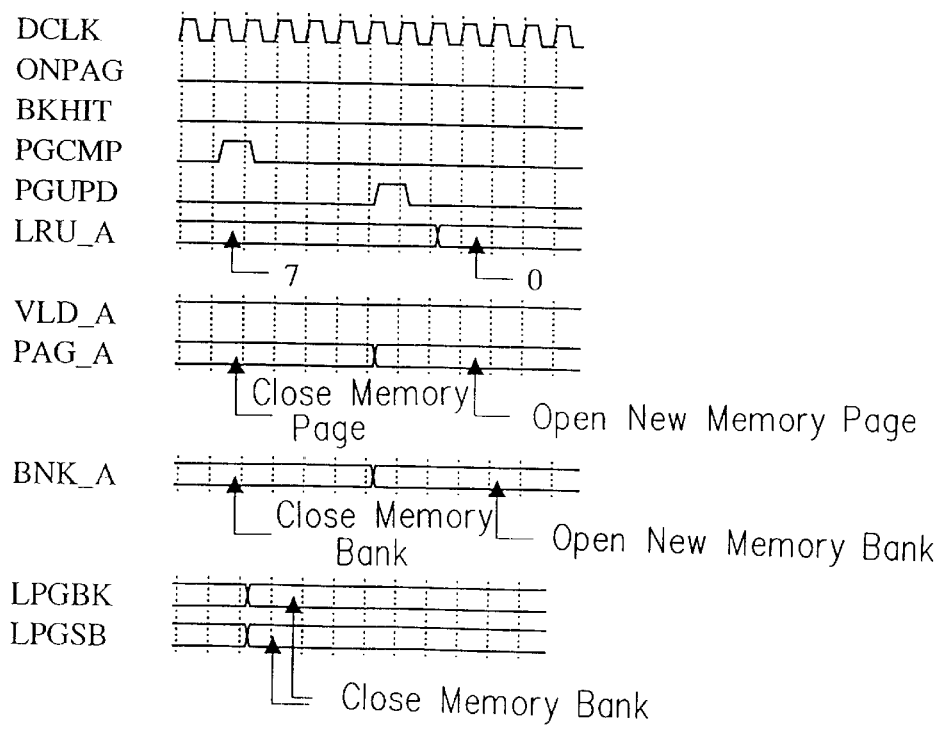

FIG. 8D is a signal sequencing diagram showing the timings between DCLK, ONPAG, BKHIT, PGCMP, PGUPD, LRU_A, VLD_A, PAG_A, BNK_A, LPGBK, and LPGSB in the case of the current access request being a bank miss and there are no unused storage cells in the page table 125. In this case, the first step is to find the row in the page table 125 that contains the highest LRU value (i.e., 7, which means that the row is the least recently used). In response to this bank-miss access request, the comparison unit 110 keeps the ONPAG and BKHIT signals unchanged in state. Subsequently at T1, the PGCMP signal is enabled to cause the latch circuit 410 in the page-table register unit 120 to latch the currently received data from the comparison unit 110. Then, from the page table 125, the row containing the highest LRU value (in this example, the row A) is selected for storage of the memory location of the current access request. Before the updating to the page table 125 is made, it is required to precharge the SDRAM unit 220 for the purpose of closing the currently-opened bank and sub-bank. Subsequently, at the rising edge of the clock cycle 77, the data stored in the selected storage cell is latched, and then the LPGBK and the LPGSB signals are switched to the enabled state to precharge the currently-opened bank and sub-bank. Subsequently at T6, the PGUPD signal is enabled to cause the PAG_A and the BNK_A signals to set the corresponding storage cells in the page table 125 to the specified values. Subsequently at T8, the LRU__A signal is enabled to set the corresponding storage cell in the page table 125 to 0; and meanwhile, all the other LRU storage cells in other rows are increased by one.

In the foregoing example, it is assumed that the SDRAM unit 220 contains 8 banks, with each bank being partitioned into four sub-banks. Therefore, the LPGBK signal is eight bits in width, with each bit being used to enable the access to one of the eight banks; and the LPGSB signal is 2 bits in width, with each bit being used to enable the access to one of the four sub-banks located in the bank specified by the LPGBK signal. When VC-SDRAM is used, then if the selected storage cell already contains data, then restore signals RXPAG[27:11] and RXSEG[1:0] are generated to restore cycle.

There are some computer systems in which the SDRAM unit is used in conjunction with other memory types, such as an EDO/FP DRAM. In this case, the 8-bit CAS#[7:0] signal from the EDO/FP DRAM is used with the SDRAM. Moreover, when refreshing the SDRAM unit, all the banks therein should be first put in idled state before the precharge can be carried out. The PGFLH signal is used to set the associated VLD value in the page table to 0 so as to allow the memory access to be switchable from the EDO/FP DRAM to the SDRAM unit. Two cases of the switching from EDO/FP DRAM to the SDRAM are depicted in the following, respectively with reference to FIGS. 9A and 9B.

Figure 9A:
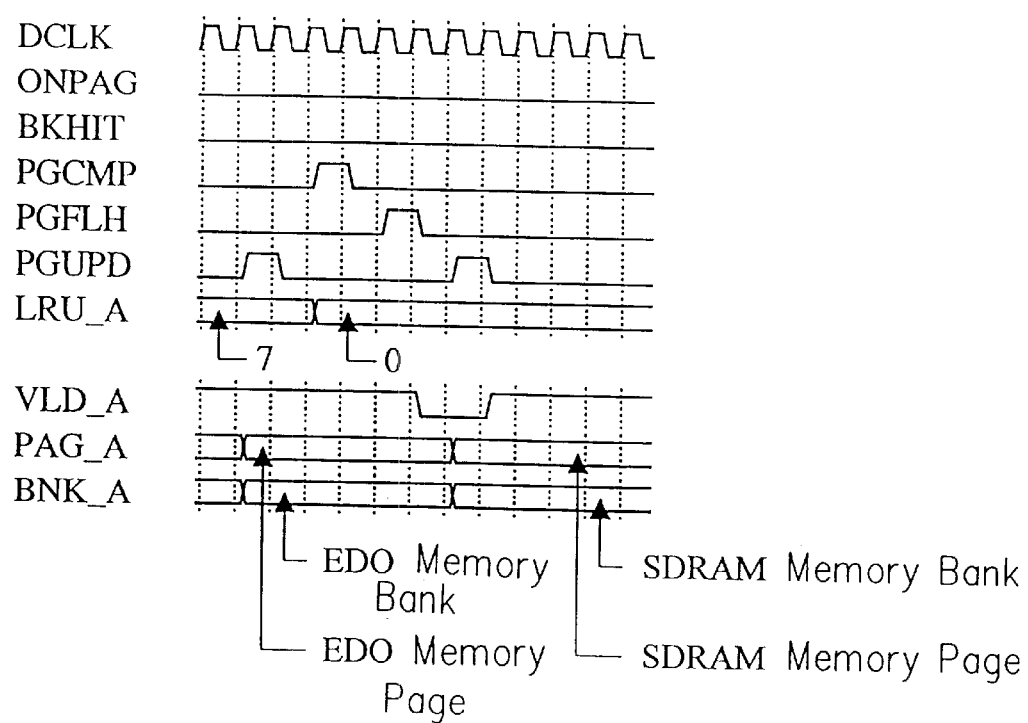
FIGS. 9A–9B are signal sequencing diagrams used to show the timings between various signals in the memory-access management system of the invention.

FIG. 9A is a signal sequencing diagram showing the timings between DCLK, ONPAG, BKHIT, PGCMP, PGFLH, LRU__A, VLD__A, PAG__A, and BNK__A in the case of the current issued access request is bank miss and the active memory access is to be switched from the EDO/FP DRAM to the SDRAM unit. As shown, at T1, the PGUPD signal is enabled to cause the PAG__A and BNK__A signals to set the corresponding storage cells in the page table 125 to the values of the requested page and bank addresses; and subsequently at T3, the LRU__A signal is enabled to set the corresponding storage cell in the page table 125 to 0, while the VLD__A signal causes the corresponding storage cell to remain unchanged in value. Subsequently, the PGCMP signal is enabled to switch the active memory access to the SDRAM unit 220. When the EDO/FP DRAM is inactive, its currently opened page cannot remain in the opened state and thus should be closed. At T5, the PGFLH signal is switched to high-voltage logic state and at T6 VLD__A is switched to low-voltage logic state, causing the EDO/FP DRAM to be deactivated. Subsequently at T7, the PGUPD signal is enabled to cause the PAG__A and BNK__A signals to set the corresponding storage cells in the page table 125 to the values of the requested page and bank addresses, and also to cause the requested page to be opened. Moreover, the VLD__A signal is restored to high-voltage logic state at T8 to set the corresponding storage cell in the page table 125 to 1 indicative of the validity of the stored address data. The LRU__A storage cell in the page table 125, however, remains at 0.

Figure 9B:
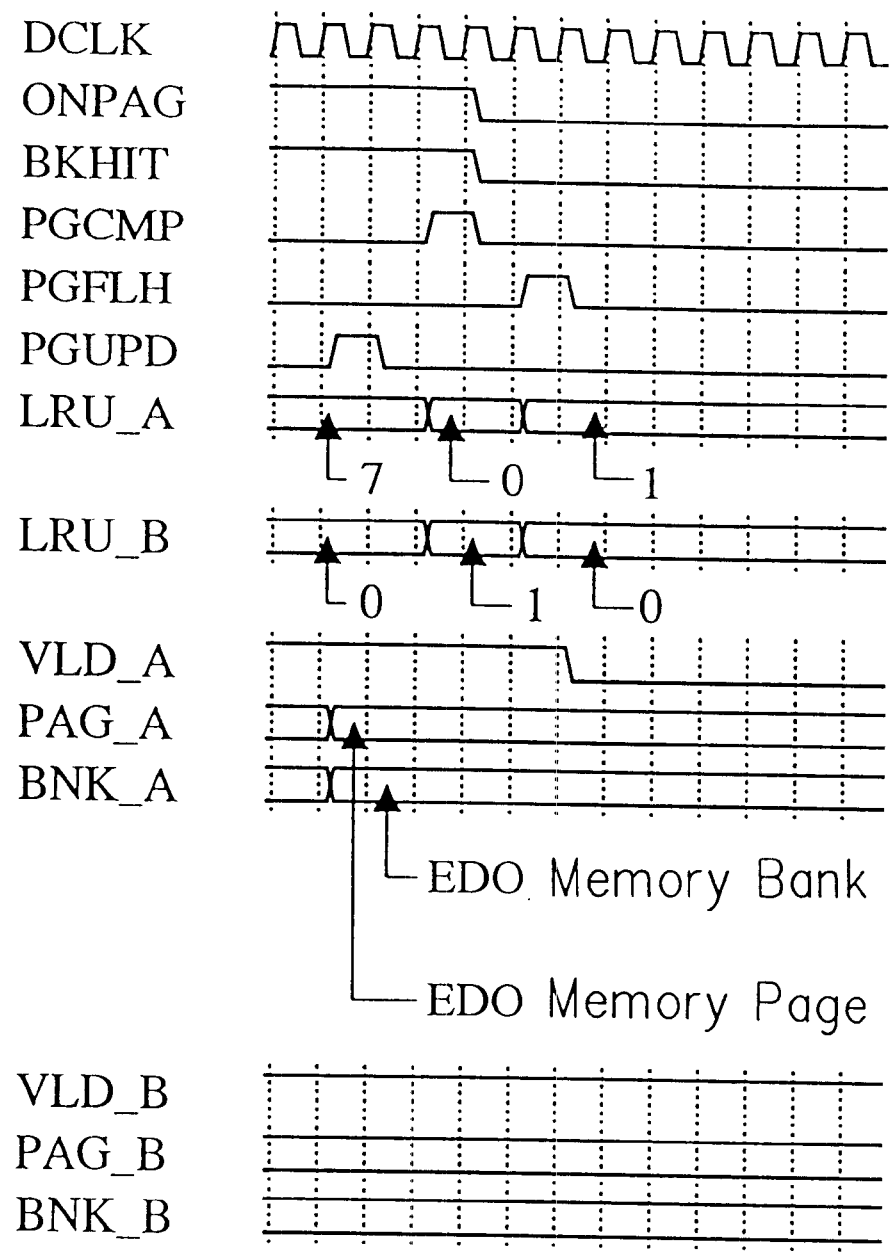

FIG. 9B is a signal sequencing diagram showing the timings between DCLK, ONPAG, PGCMP, PGFLH, PGUPD, LRU__A, LRU__B, VLD__A, PAG__A, BNK__A, VLD__B, PAG__B, and BNK__B in the case of the current issued access request being a bank hit and the active memory access is to be switched from the EDO/FP DRAM to the SDRAM unit. As shown, at T1, the PGUPD signal is enabled to cause the PAG__A and BNK__A signals to set the corresponding storage cells in the page table 125 to the values of the requested page and bank addresses; and subsequently at T3, the LRU__A signal is enabled to set the corresponding storage cell in the page table 125 to 0, while the value of the LRU__B signal is increased by one and the VLD__A storage cell remains unchanged. Subsequently at T3, the PGCMP signal is enabled to switch the active memory access to the SDRAM unit 220. Subsequently at T5, since the comparison unit 110 indicates that the current access request is a hit to the memory location stored in the row B of the page table 125, the LRU__B signal is enabled to cause the corresponding storage cell in the page table 125 to be set to 0; and meanwhile, all the other LRU storage cells in other rows that are less than the original value stored in the LRU__B storage cell are increased by one. Moreover, the LRU__A signal is enabled to cause the corresponding storage cell in the page table 125 to be switched from 0 to 1. After this, the PGFLH signal is switched to high-voltage logic state and the VLD__A signal is switched to low-voltage logic state, causing the EDO/FP DRAM to be closed.

Before performing a refreshing process, all the banks in the SDRAM unit 220 should be precharged first. To do this, all the VLD values in the page table 125 should be first set to 0 indicative of invalidity of all the address data in the page table 125. Moreover, when using VC-SDRAM, since it uses an auto-precharge feature, the address data in the page table 125 require no updating.

In conclusion, the memory-access management method and system of the invention has the following advantages. First, it can increase the memory access performance by tracking the history of the previous access operations to the SDRAM. Second, it can judge in advance whether the next pipelined access requires precharge or not; if yes, a precharge-enable signal is issued at the time the current access is being handled. As a result, the delay in access can be reduced. Overall, the memory access performance is increased.

The invention has been described using exemplary preferred embodiments. However, it is to be understood that the scope of the invention is not limited to the disclosed embodiments. On the contrary, it is intended to cover various modifications and similar arrangements. The scope of the claims, therefore, should be accorded the broadest interpretation so as to encompass all such modifications and similar arrangements.

What is claimed is:

1. A memory-access management system for tracking access history to a memory unit, which comprises:

a page-table register unit including a page table for storing a predefined number of recently accessed memory locations to the memory unit, each stored memory location being stored along with a least-recently-used record indicative of whether the stored memory location is least recently accessed;

a comparison unit capable of, in response to each access request to the memory unit, checking whether the requested memory location is a hit to any one stored in the page table in the page-table register unit; if hit, the comparison unit generating a hit signal;

a utilization-rate register unit, coupled to the page-table register unit, for monitoring the least-recently-used records stored in the page-table register unit; and a validity-checking unit, coupled to the page-table register unit, for checking whether the accessed memory location stored in the page table in the page-table register unit is valid or invalid, wherein when the access memory is valid, a page with respect to the accessed memory location is restored and a previously opened page is closed.

2. The memory-access management system of claim 1, wherein the page-table register unit includes:
- a latch circuit, coupled to the comparison unit, for latching the output signals from the comparison unit indicative of whether the requested memory location is a hit to the page table; and
- a selection circuit, coupled to the latch circuit, the utilization-rate register unit, and the validity-checking unit, for selecting one of the stored memory locations in the page table based on the output signals from the latch circuit, the utilization-rate register unit, and the validity-checking unit.

3. The memory-access management system of claim 1, wherein the page table further includes a validity bit in association with each stored memory location, the validity bit indicating whether the stored memory location is valid or invalid.

4. The memory-access management system of claim 3, wherein the validity bit of each stored memory location is set and updated by the comparison unit.

5. The memory-access management system of claim 4, wherein the least-recently-used record in association with each stored memory location in the page table is set and updated by the utilization-rate register unit.

6. The memory-access management system of claim 5, wherein each least-recently-used record is represented by a numerical value in a predefined range of numbers, with the smallest value indicating that the associated memory location has been most recently accessed and the highest value indicating that the associated memory location has been least recently accessed.

7. The memory-access management system of claim 6, wherein in the event that the current access request is a miss to the page table, the memory location of the current access request is used to replace the one whose least-recently-used record has the highest value.

8. The memory-access management system of claim 7, wherein before the memory location of the current access request replaces the one whose least-recently-used record has the highest value, the validity-checking unit checks whether the associated validity bit is set to indicate validity; if yes, a restore signal is generated to restore the corresponding memory location to original state.

9. A memory-access management system for tracking access history to a memory unit, which comprises:
- a page-table register unit including a page table for storing a predefined number of recently accessed memory locations to the memory unit, each stored memory location including a bank address and a page address, and each stored memory location being stored along with a least-recently-used record and a validity bit, with the least-recently-used record indicative of whether the associated memory location is least recently used and the validity bit indicative of whether the associated memory location is valid or invalid; and each least-recently-used record being represented by a numerical value in a predefined range of numbers, with the smallest value indicating that the associated memory location has been most recently accessed and the highest value indicating that the associated memory location has been least recently accessed
- a comparison unit capable of, in response to each access request to the memory unit, checking whether the requested memory location is a bank hit or a page hit to any one of the memory locations stored in the page table in the page-table register unit; the comparison unit generating a bank-hit signal if bank hit and a page-hit signal if page hit;
- a utilization-rate register unit, coupled to the page-table register unit, for monitoring the least-recently-used records stored in the page-table register unit, and in the event of page miss and bank miss to the page table, capable of replacing the one of the stored memory locations in the page table that is least recently accessed with the memory location of the current access request; and
- a validity-checking unit, coupled to the page-table register unit, for checking whether the address data stored in the page table in the page-table register unit is valid or invalid,
- wherein when the access memory is valid, a page with respect to the accessed memory location is restored and a previously opened page is closed.

10. The memory-access management system of claim 9, wherein in the event that the current access request is a bank hit and yet a page miss, the page-table register unit replaces the current page address stored in the page table with the page address of the current access request.

11. A memory-access management method for tracking access history to a memory unit, which comprises the steps of:
(1) providing a page table for storing a predefined number of recently accessed memory locations to the memory unit, each stored memory location being stored along with a least-recently-used record and a validity bit, with the least-recently-used record indicative of whether the associated memory location is least recently used and the validity bit indicative of whether the associated memory location is valid or invalid;
(2) in response to an access request, comparing the requested memory location with the memory location data stored in the page table to see if there is a match; if yes, generating a hit signal; whereas
 if not, replacing the one of the stored memory locations in the page table that is least recently accessed with the memory location of the current access request; and
(3) checking whether the associated validity bit of the least recently-accessed memory location is set to indicate validity; if yes, generating a restore signal to restore the corresponding memory location to original state,
wherein when the access memory is valid, a page with respect to the memory location is restored and a previously opened page is closed.

* * * * *